No. 651,268. Patented June 5, 1900.
E. F. PICKETT.
VALVE FOR PNEUMATIC TIRES.
(Application filed Aug. 26, 1899. Renewed Apr. 27, 1900.)
(No Model.)
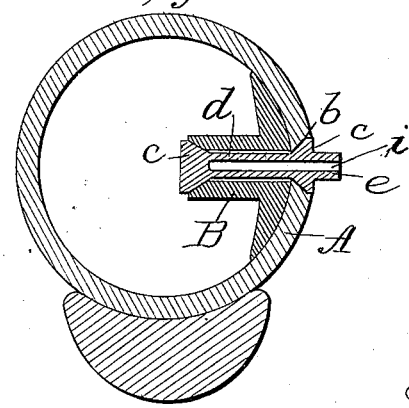
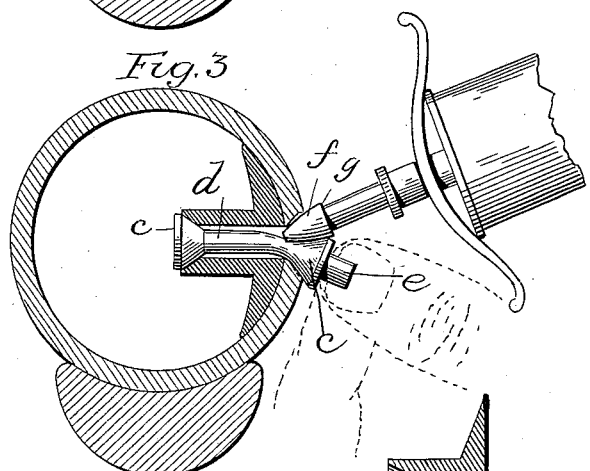
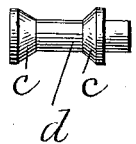
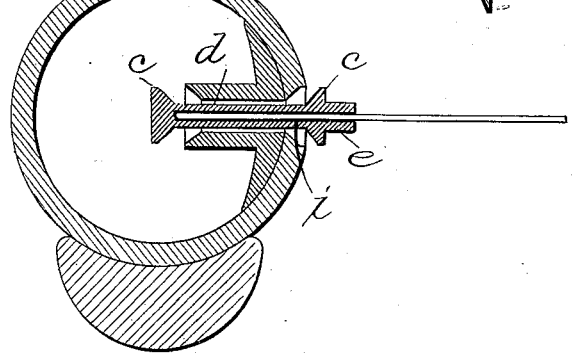
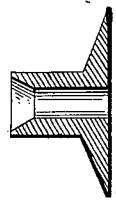
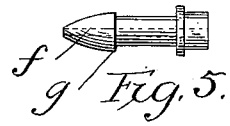
Witnesses
Walter Donaldson
Wm. F. Hall
Inventor
EDWARD F. PICKETT
by F. L. Middleton
Attorney

UNITED STATES PATENT OFFICE.

EDWARD F. PICKETT, OF BUFFALO, NEW YORK, ASSIGNOR TO THE AMERICAN PNEUMATIC VALVE COMPANY, OF NEW YORK.

VALVE FOR PNEUMATIC TIRES.

SPECIFICATION forming part of Letters Patent No. 651,268, dated June 5, 1900.

Application filed August 26, 1899. Renewed April 27, 1900. Serial No. 14,612. (No model.)

*To all whom it may concern:*

Be it known that I, EDWARD F. PICKETT, a citizen of the United States, residing at Buffalo, in the county of Erie and State of New York, have invented certain new and useful Improvements in Valves for Pneumatic Tires, of which the following is a specification.

My invention is an improvement upon the valve patented to me October 18, 1898, under number 612,570, for pneumatic tires.

The improvement is intended to add to the efficiency of the valve without adding to its cost and to provide for a simpler and more practical application of the improvement to the tire.

In the accompanying drawings, Figure 1 represents a section of a tire having my improved valve shown as applied thereto and in section. Fig. 2 is a detailed view of the valve shown in elevation. Fig. 3 shows the valve in place in the tire and in the position it assumes when the pump-nipple is about to be introduced to inflate the tire. Fig. 4 shows a similar view with the valve in position to deflate the tire. Fig. 5 is a detailed view of the nipple of the pump for inflating the tire. Fig. 6 is a detailed view of the valve-casing.

As shown in Fig. 1, the tire A is of ordinary or approved construction, and preferably at one side my valve is applied for the reason stated in my patent aforesaid. Instead of extending the casing entirely through the tire and providing it with the flanges or collars, one on each side of the tire, I simplify the construction by omitting the outer flange and make the tube B with a head or flange adapted to conform to the interior of the tire, and this is made by molding or otherwise and attached to the inner wall of the tire, and then vulcanized, so as to become practically integral and of one piece therewith. Thus I form the valve tube or casing with but one of the valve-seats—the inner—and in this form of my invention I construct the outer valve-seat in the tire itself, as shown at *b*.

The valve is substantially like that shown in my former patent, comprising, essentially, a double-valve part, one at or near each end, with an elastic connection between to keep the valves both pressed against their seats. The valve is preferably in one piece and of soft rubber, as described in my patent aforesaid. The valve parts are preferably conical, as at *c c*, and the elastic connection *d*, between, of less diameter; but I do not limit myself to the shape of the valve parts, as these may be of any suitable shape so long as they fit proper valve-seats closely enough to prevent leakage.

Another important feature of the invention is the means for inflating the tire readily. To this end I provide the valve-stem with an extension or projection C beyond the side or periphery of the tire, and when it is desired to inflate the tire the projection is grasped by the fingers, as shown in Fig. 3, and drawn to one side, thus leaving an opening or space between the outer valve and the wall of the tube or casing, into which the end of the inflating-nipple of the pump may be inserted. In my patent heretofore referred to I illustrated a special form of nozzle and pin for the inflation of the tire; but in the present case I am enabled to use a plain simple form of nipple or nozzle with a central bore, such as shown in Fig. 5, and when the outer valve is drawn aside by the projection *e*, as seen in Fig. 3, the nipple is simply inserted and retained by friction, requiring no screw connection, as at present where the metal valve-casings are used. The nipple preferably has a threaded rear end for attachment to the pump, while the front end *f* is preferably rounded and slightly tapering and may have a shoulder *g*, though this is not absolutely essential, but adds to the frictional contact.

To deflate the tire, I have provided simple means. The outer valve and stem are formed with a central recess *i*, extending to near the inner valve, and when it is desired to deflate a wire is inserted in the recess and sufficient force is applied to force the inner valve from its seat, which thus allows the air to escape, as shown in Fig. 4.

What I claim is—

1. In combination with a tire, a valve tube or casing secured thereto and having a valve-seat in one end, a second seat in the outer face of the tire and elastically-connected valves fitted to said seats, substantially as described.

2. In combination with a tire, a valve tube or casing vulcanized to the inner wall of the tire having a seat in one end, a second being formed in the tire, and valves, connected elastically, fitted to said seats and movable independently therefrom, substantially as described.

3. A valve for pneumatic tires comprising a connecting-stem, a valve at each end, and a projection or extension at one end for moving the outer valve laterally, substantially as described.

4. In combination with a tire, a valve tube or casing, a valve-stem, a valve at each end fitted to seats, and means for deflating the tire consisting of a longitudinal recess in the valve-stem adapted to receive a wire or the like to unseat the inner valve, substantially as described.

In testimony whereof I affix my signature in presence of two witnesses.

EDWARD F. PICKETT.

Witnesses:
  HENRY E. COOPER,
  R. E. OURAND.